United States Patent [19]
Toulier

[11] 3,814,223

[45] June 4, 1974

[54] ONE-WAY CLUTCH DEVICE FOR THE STARTER DRIVE OF AN INTERNAL COMBUSTION ENGINE

[75] Inventor: Pierre Toulier, Ville D'Avray, France

[73] Assignee: Societe Anonyme D.B.A., Paris, France

[22] Filed: Jan. 5, 1973

[21] Appl. No.: 321,182

[30] Foreign Application Priority Data
Jan. 14, 1972 France .............................. 72.01218

[52] U.S. Cl. .......................... 192/46, 74/6, 74/577 S
[51] Int. Cl. ............................................. F16d 11/00
[58] Field of Search .............. 192/42, 46; 74/6, 7 C; 64/30 D, 30 E

[56] References Cited
UNITED STATES PATENTS
3,200,918  8/1965  Horn ................................... 192/46

Primary Examiner—Samuel Scott
Assistant Examiner—Frank H. McKenzie, Jr.
Attorney, Agent, or Firm—William S. Thompson

[57] ABSTRACT

A one-way clutch device for the starter drive of an internal combustion engine. The one-way clutch comprise a driving ring and a driven ring concentrically arranged. The driven ring is provided with axial grooves, and the driving ring includes a substantially radial pawl retractably received in the grooves. The pawl is a strip-like element inserted in the driving ring and located between two abutments of elastomeric material, one abutment being substantially not deformable to hold the pawl in a substantially radial position within one groove, and the other abutment being resiliently deformable, enabling the pawl to move out of the groove, and returning said pawl to a radial position into cooperation with the groove when at rest.

7 Claims, 3 Drawing Figures

PATENTED JUN 4 1974  3,814,223

ONE-WAY CLUTCH DEVICE FOR THE STARTER DRIVE OF AN INTERNAL COMBUSTION ENGINE

BACKGROUND OF THE INVENTION

Known one-way clutch devices consist essentially of two concentric rings, one driving and the other driven, between which means are provided for transmitting a torque from one to the other. In the known devices, in which the intermediate means are friction plates or wedging rollers retained by return springs, the level of vibrations is not always satisfactory, and in the case of a starter drive for an internal combustion engine the vibrations may cause deformation of the springs or polishing of the wedging surfaces, so that the device does not provide a reliable operation.

SUMMARY OF THE INVENTION

The one-way clutch device according to the invention is of the type comprising two concentric rings, one driving and the other driven, of which one is provided with axial grooves, a retracting element fixed to the other ring being capable of cooperating with the grooves to transmit torque from the driving ring to the driven ring. It is characterized in that the retracting element is a pawl-forming element inserted in the driving ring and situated between two abutments of elastomeric material, one abutment being substantially not deformable and holding the pawl-forming element in a substantially radial position within one groove of the driven ring in the clutching condition of the device, and the other abutment being resiliently deformable.

This arrangement provides two essential advantages which are an advance on the existing devices: satisfactory vibration-resistance due to the elastomeric material used, and a damping action at the moment of torque transmission.

Other features will be apparent from the reading of this specification to those skilled in the art.

DETAILED DESCRIPTION OF A PREFERRED EMBODIMENT

Figure 3:
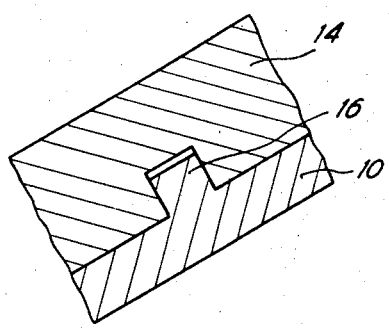
FIG. 3 is a partial section along a line 3—3 in FIGS. 1 and 2, illustrating the means by which the driving ring is driven by the starter drive sleeve.
Figure 2:
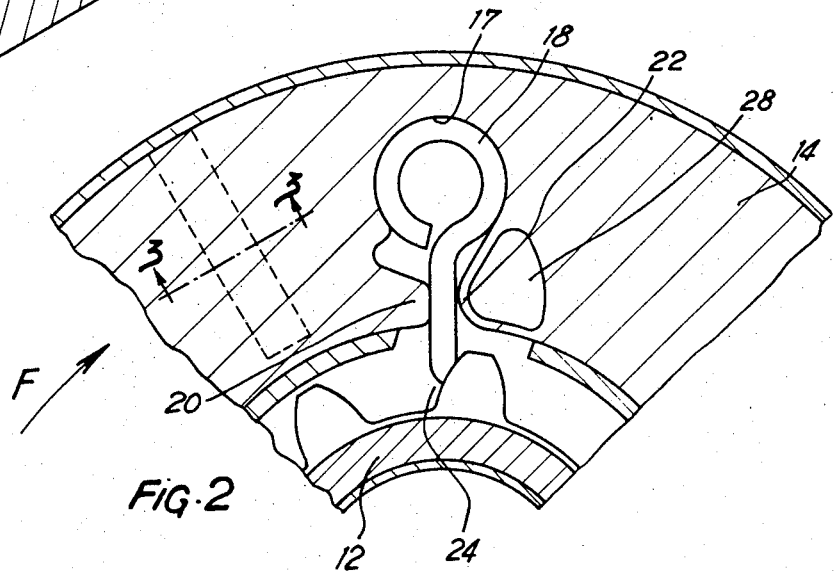
FIG. 2 is a partial radial section illustrating the relative arrangement of the driven ring, of the driving ring, and of the pawl which transmits torque from one to the other.
Figure 1:
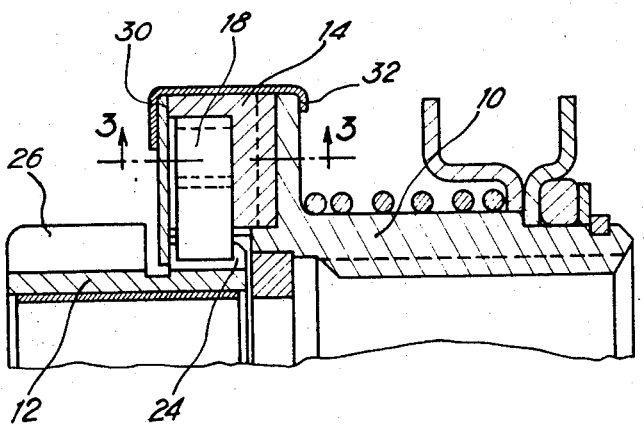
FIG. 1 represents an axial section through a starter drive incorporating a device embodying the invention.

The starter drive shown in FIG. 1 is intended to transmit the driving torque from a starter motor to an internal combustion engine which requires to be started.

It comprises a sleeve 10 driven by a starter motor (not shown) and a pinion 12 capable of meshing with the ring gear of the engine to be started (not shown). The sleeve 10 is connected to the driving ring 14 by radial projections 16 on the sleeve, which cooperate with corresponding radial grooves in the ring 14. The driving ring 14 is made from elastomeric material, for example rubber, and contains a recess 17 for receiving the end of a pawl 18. The pawl 18 is a metal sheet of which one end is rolled to form a pivot and is inserted in a cylindrical portion of the recess 17, and of which the other end cooperates with grooves 24 formed in the driven ring 12. To reduce machining of the assembly, these grooves 24 may form extensions of the spaces 26 between the teeth of the pinion 12. The opening of the recess 17 faces the driven ring 12 and comprises two abutments 20, 22 which face one another and exert force on the pawl 18 towards the right and left respectively in the drawings. The abutment 20 is made from elastomeric material capable of little compression, and the abutment 22 from readily deformable elastomeric material. The deformable abutment 22 may be made by forming a void 28 in the elastomeric material of the driving ring. The driving ring 14 is housed in a metal casing including a plate 30, which closes the recess 17, and a collar 32 flanged on to the starter drive sleeve 10.

The device described above operates as follows. When the driving ring 14 is driven in the direction of the arrow F in the drawing, the pawl 18 is held in its radial position by the abutment 20 and cooperates with the grooves 24 in the driven ring 12. This corresponds to the clutched condition of the device. When the ring 14 is driven in the opposite direction from the arrow F, or if the driven ring 12 is driven by the engine which has been started at a speed higher than that of the starter motor, the pawl 18 engages the deformable abutment 22 and can therefore move out of its radial position, disengaging from the grooves 24 in the driven ring. This is the unclutched condition of the device. At rest, the abutment 22 brings the pawl 18 back to bear on the abutment 20, i.e., into a radial position.

I claim:

1. A one-way clutch device for the starter drive of an internal combustion engine, comprising two concentric rings, one driving and the other driven, of which one is provided with axial grooves, a retracting element fixed to the other ring being capable of cooperating with the grooves to transmit torque from the driving ring to the driven ring, wherein the retracting element is a pawl-forming element inserted in the driving ring and situated between two abutments of elastomeric material, one abutment being substantially not deformable and holding the pawl-forming element in a substantially radial position within one groove of the driven ring in the clutching condition of the device, and the other abutment being resiliently deformable enabling the pawl to retract out of the groove, and returning said pawl to a radial position into cooperation with the groove when at rest.

2. A one-way clutch device as claimed in claim 1, characterized in that the driving ring is of elastomeric material and comprises a recess capable of receiving one end of the pawl and having an opening directed towards the driven ring, the opening comprising the two abutments, which are opposite to one another.

3. A one-way clutch device as claimed in claim 1, wherein the pawl is formed by a strip of which one end is rolled to form a pivot inserted in a cylindrical portion of the recess.

4. A one-way clutch device as claimed in claim 1, wherein the resiliently deformable abutment is a projection of elastomeric material in which a void is formed.

5. A one-way clutch device as claimed in claim 1, wherein the driving ring is connected to the sleeve of the starter drive by radial projections on this ring, these projections cooperating with grooves formed in the body of the sleeve.

6. A one-way clutch device as claimed in claim 1, wherein the driving ring is housed in a metal casing comprising a plate closing the pawl-receiving recess and a collar flanged on to the body of the sleeve of the starter drive.

7. A one-way clutch device as claimed in claim 1, wherein the grooves in the driven ring are extensions of the spaces between the teeth of the pinion cooperating with the ring gear of the engine to be started.

* * * * *